United States Patent
Akif et al.

(10) Patent No.: US 11,945,516 B2
(45) Date of Patent: Apr. 2, 2024

(54) AIR FLAP SYSTEM

(71) Applicant: Bayerische Motoren Werke Aktiengesellschaft, Munich (DE)

(72) Inventors: Oeztzan Akif, Munich (DE); Christian Hack, Schweitenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 296 days.

(21) Appl. No.: 17/595,357

(22) PCT Filed: May 12, 2020

(86) PCT No.: PCT/EP2020/063182
§ 371 (c)(1),
(2) Date: Nov. 15, 2021

(87) PCT Pub. No.: WO2020/234047
PCT Pub. Date: Nov. 26, 2020

(65) Prior Publication Data
US 2022/0212729 A1 Jul. 7, 2022

(30) Foreign Application Priority Data

May 17, 2019 (DE) ..................... 10 2019 113 161.8

(51) Int. Cl.
*B62D 35/00* (2006.01)
*B60K 13/02* (2006.01)

(52) U.S. Cl.
CPC .............. *B62D 35/00* (2013.01); *B60K 13/02* (2013.01)

(58) Field of Classification Search
CPC ...... B60K 11/085; B60K 13/02; B62D 35/00; B60R 19/52; B60R 2019/527; B60Y 2410/113; B60Y 2306/01; F01P 11/00; Y02T 10/88
See application file for complete search history.

(56) References Cited

U.S. PATENT DOCUMENTS

| 2,578,068 A | 12/1951 | Johnson |
| 2011/0048691 A1 | 3/2011 | Shin et al. |
| 2014/0117709 A1 | 5/2014 | Yoo |
| 2016/0368367 A1 | 12/2016 | Schoening et al. |

(Continued)

FOREIGN PATENT DOCUMENTS

| CN | 101994563 A | 3/2011 |
| CN | 103786672 A | 5/2014 |

(Continued)

OTHER PUBLICATIONS

International Search Report (PCT/ISA/210) issued in PCT Application No. PCT/EP2020/063182 dated Aug. 18, 2020 with English translation (five (5) pages).

(Continued)

*Primary Examiner* — Lori Lyjak
(74) *Attorney, Agent, or Firm* — Crowell & Moring LLP

(57) ABSTRACT

An air flap system for controlling the intake of air into a motor vehicle includes at least one air flap which can be pivoted between an open position and a closed position, and an elastic element which is provided to couple the air flap system to a vehicle frame. The elastic element is elastic at least partially along the longitudinal direction of the vehicle.

12 Claims, 3 Drawing Sheets

(56) References Cited

U.S. PATENT DOCUMENTS

| | | | |
|---|---|---|---|
| 2018/0134146 A1 | 5/2018 | Vacca | |
| 2018/0327032 A1 | 11/2018 | Vacca et al. | |
| 2018/0361847 A1 | 12/2018 | Vacca | |
| 2022/0212729 A1* | 7/2022 | Akif | B60K 13/02 |

FOREIGN PATENT DOCUMENTS

| | | | | |
|---|---|---|---|---|
| CN | 206615186 U | | 11/2017 | |
| CN | 107995898 A | | 5/2018 | |
| CN | 108290494 A | | 7/2018 | |
| CN | 108349376 A | | 7/2018 | |
| DE | 10 2010 002 373 A1 | | 9/2011 | |
| DE | 102011004169 A1 | * | 8/2012 | ......... B60H 1/00671 |
| DE | 102013225629 B3 | * | 4/2015 | ............ B60J 5/0493 |
| DE | 10 2016 205 853 A1 | | 10/2017 | |
| EP | 2 596 973 A1 | | 5/2013 | |
| EP | 3 106 339 A1 | | 12/2016 | |
| KR | 20110134698 A | * | 12/2011 | |
| KR | 20130026875 A | * | 3/2013 | |
| KR | 101646475 B1 | * | 8/2016 | |
| WO | WO-2006066680 A1 | * | 6/2006 | ........... B60K 11/085 |
| WO | WO-2017021205 A2 | * | 2/2017 | ........... B60K 11/085 |

OTHER PUBLICATIONS

German-language Written Opinion (PCT/ISA/237) issued in PCT Application No. PCT/EP2020/063182 dated Aug. 18, 2020 (seven (7) pages).

German-language Search Report issued in German Application No. 10 2019 113 161.8 dated May 8, 2020 with partial English translation (11 pages).

English Translation of Chinese-Language Office Action issued in Chinese Application No. 202080033536.7 dated Dec. 1, 2023 (8 pages).

* cited by examiner

AIR FLAP SYSTEM

BACKGROUND AND SUMMARY OF THE INVENTION

The present invention relates to an air flap system for controlling the intake of air into a motor vehicle, to a method for assembling an air flap system, and to a motor vehicle equipped with such an air flap system.

In motor vehicles nowadays, for aerodynamic reasons, air flap systems are provided in order to be able to control the intake of air into the motor vehicle actively by means of adjustable air flaps in the region of the radiator grille. The improvement in the aerodynamics of motor vehicles is one of the possibilities for reducing the fuel consumption and therefore the $CO_2$ emission of the motor vehicles. For example, closing the air flap can cause the production of an air cushion in front of the radiator grille, which prevents or at least reduces swirling of the air. On the other hand, the intake of air or fresh air into the engine or the passenger compartment has to be possible at all times for obvious reasons. The air flaps are generally adjusted by an electric actuator.

It is known to fasten air flap systems having integrated radiator sensors rigidly in the vehicle frame. The relatively high costs which occur because of refastening the air flap system and the radar sensors following an impact at low speeds are a disadvantage of such an arrangement. In the event of a parking prang (accident) at low speeds or at low loads on the vehicle faring, bumper and the air flap system, the air flap system can be brought out of the starting position. If a radar sensor is installed in the air flap system, it is likewise brought as a result out of its starting position. This may impair the operation of the radar sensor.

The present invention is based on the object of providing an air flap system for controlling the intake of air into a motor vehicle, a method for assembling such an air flap system, and a motor vehicle comprising such an air flap system.

This object is achieved by an air flap system, a method, and a motor vehicle, in accordance with the independent claims. Advantageous developments of the invention are the subject matter of the dependent claims.

An air flap system according to the invention for controlling the intake of air into a motor vehicle comprises at least one air flap which is pivotable between an open position and a closed position. The air flap system furthermore comprises an elastic element which is provided for coupling the air flap system to a vehicle frame. The elastic element is elastic at least partially along the longitudinal direction of the vehicle.

The solution according to the invention makes it possible to bring about resetting of the air flap system simply and cost-effectively. At the same time, regulatory requirements regarding pedestrian protection can be maintained. In the event of a parking prang at low speeds or at low loads on the vehicle faring, bumper and the air flap system, the air flap system can be reset into the starting position, for example, by spring elements on both sides of the mounting. The impact causes the air flap system to be brought out of the starting position. If a radar sensor is installed in the air flap system, it is likewise brought out of its starting position as a result. This may impair the operation of the radar sensor. The elastic element located in the mounting of the air flap system resets the air flap system into the starting position. Restriction-free functioning of the radar sensor is therefore ensured.

In one embodiment of the air flap system, the elastic element brings about a resetting force in order to bring the air flap system back into a starting position after an impact event.

In a further embodiment of the air flap system, the air flap system furthermore comprises a radar sensor for detecting an object.

In a further embodiment of the air flap system, the air flap system is mounted elastically by means of the elastic element.

In a further embodiment of the air flap system, the air flap system has an air flap system frame, wherein the elastic element is clipped in the air flap system frame. The clipping of the elastic element permits a well-defined positioning.

In a further embodiment of the air flap system, the air flap system has a holding element which is used for the coupling between air flap system and vehicle frame, wherein the holding element is fastened, in particular screwed, to the vehicle frame.

In a further embodiment of the air flap system, the elastic element comprises a plastics spring or a metal spring. In particular the use of a plastics spring makes it possible to dispense with using a highly tensioned steel spring.

In a further embodiment of the air flap system, the radar sensor is arranged in an upper cooling air inlet of the air flap system.

In a further embodiment of the air flap system, a breakaway force corresponds to a force which is necessary for releasing the elastic element from a locking position, wherein the breakaway force is greater than or equal to the resetting force. The provision of a breakaway force at which the elastic element is broken away from a predetermined breaking point into the starting position makes a higher force unnecessary for the return into the latching positions. Instead, the elastic element can drop back into the breakaway position without application of force.

A method according to the invention for assembling an air flap system for controlling the intake of air into a motor vehicle, wherein the air flap system comprises at least one air flap which is pivotable between an open position and a closed position, comprises the following steps:
 providing an elastic element in the air flap system; and
 coupling the elastic element to a vehicle frame, wherein the elastic element is elastic at least partially along the longitudinal direction of the vehicle.

The object mentioned at the beginning is also achieved by the motor vehicle which is equipped with the abovementioned air flap system. Accordingly, the same or similar advantages as described in conjunction with the above are also afforded, and therefore reference is made to the above embodiment in conjunction with the device according to the invention in order to avoid repetitions.

Some advantageous embodiments of the invention will be explained by way of example below with reference to the figures.

DETAILED DESCRIPTION OF THE DRAWINGS

Orientation details, such as, for example, "left", "right", "top" and "bottom" and also "vertically" and "horizontally" relate to an arrangement as is conventionally provided in motor vehicles located on a horizontal surface without this being intended to constitute a limitation.

Figure 1:
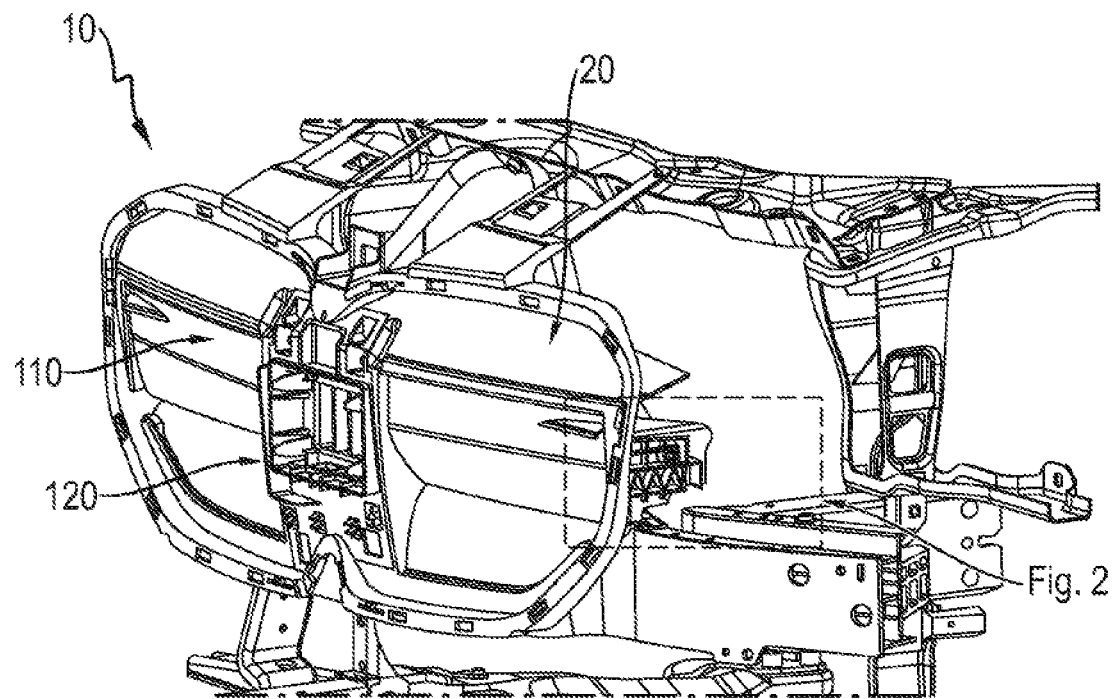
FIG. 1 shows an air flap system according to a first embodiment.

FIG. 1 shows an air flap system 10 for controlling the intake of air into a motor vehicle. Air flap system 10 comprises at least one air flap 110. Air flap 110 is pivotable between an open position and a closed position.

Figure 2:
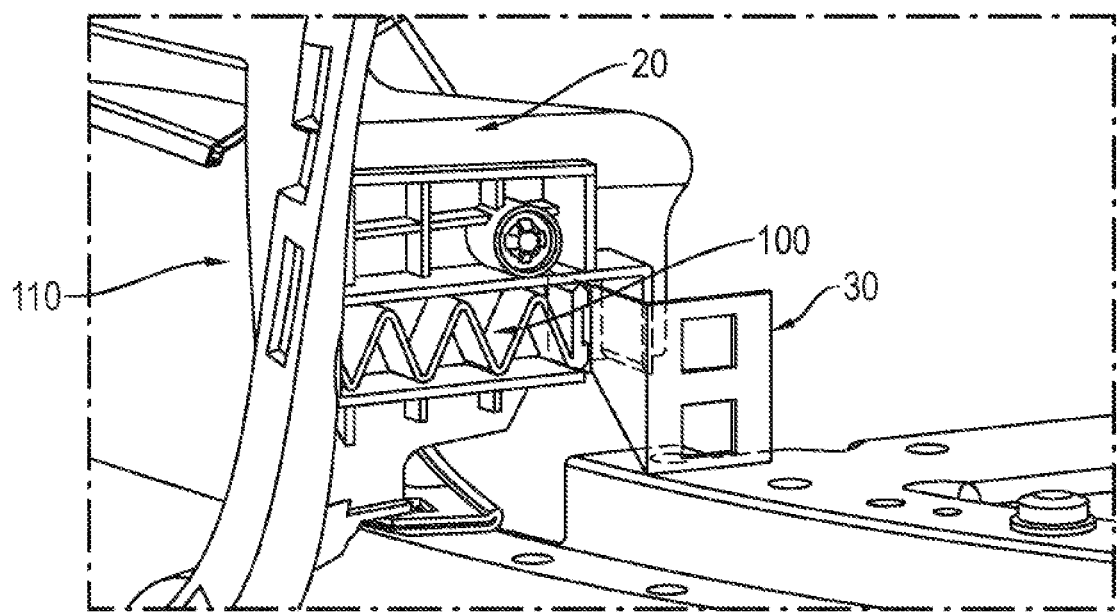
FIG. 2 shows an enlarged detail of the image from FIG. 1.
Figure 3:
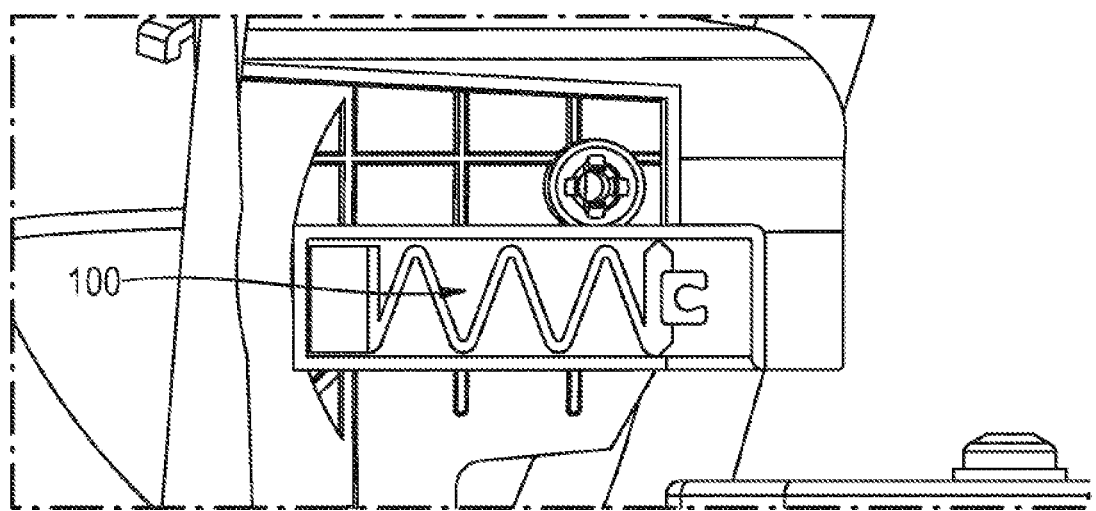
FIG. 3 and FIG. 4 show side views of the first embodiment.
Figure 4:
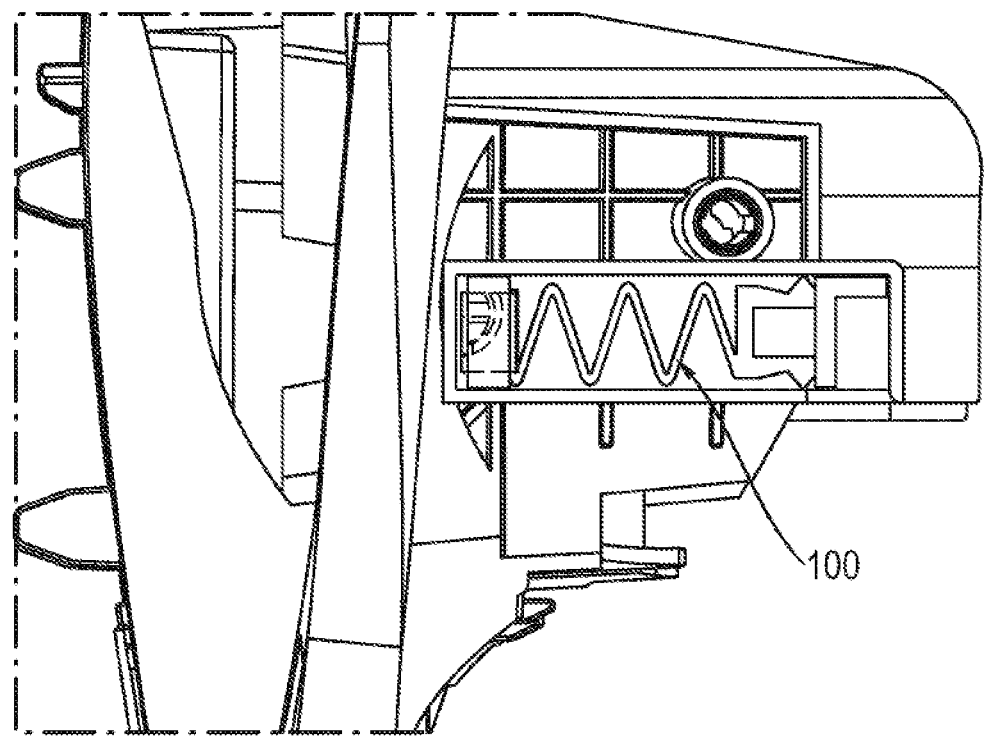
Figure 5:
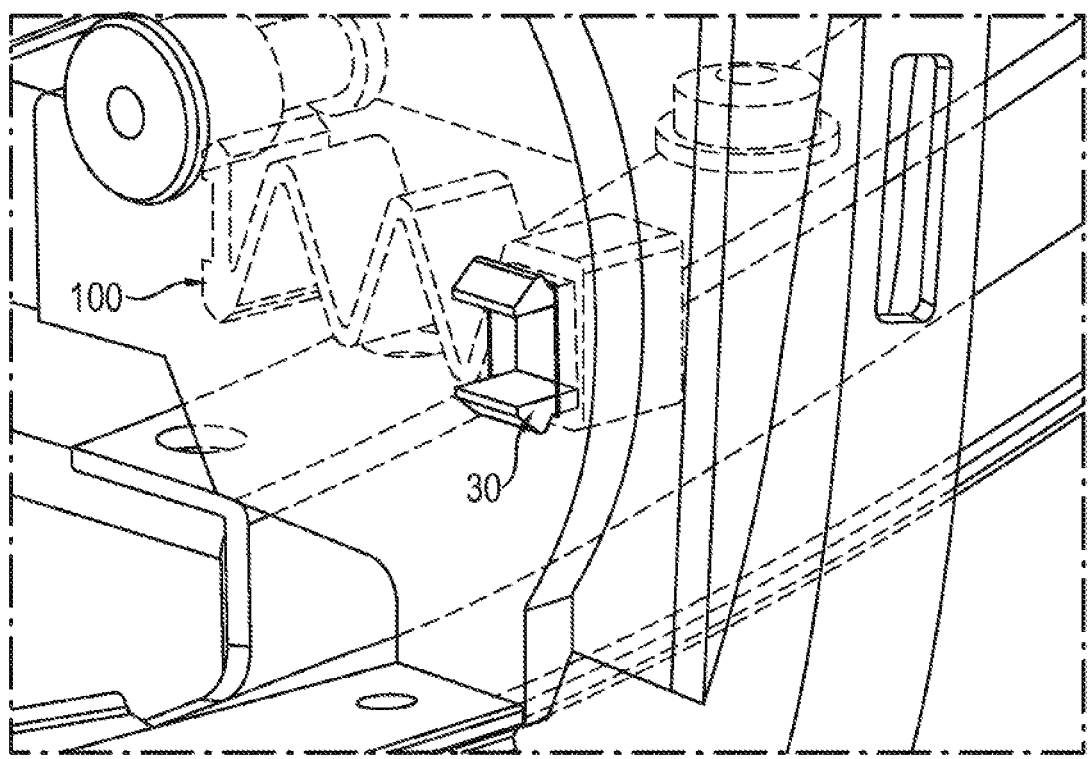
FIG. 5 shows a perspective view of the first embodiment from a different viewing direction.

Air flap system 10 comprises a spring element 100 (shown in more detail in FIG. 2 which shows a detail from FIG. 1). Spring element 100 is an example of an elastic element. Spring element 100 is provided for coupling air flap system 10 to a vehicle frame. Spring element 100 is elastic here at least partially along the longitudinal direction of the vehicle.

Further illustrations of spring element 100 are apparent from FIGS. 2 to 5 which essentially refer to the region of a rectangle marked by dashed lines in FIG. 1.

Spring element 100 brings about a resetting force in order to bring air flap system 10 back into a starting position after an impact event. An elastic mounting of air flap system 10 can be achieved with the aid of spring element 100. Spring element 100 is configured in particular as a compression spring. Spring element 100 may comprise, for example, a spiral spring and extends at least partially in the longitudinal direction of the vehicle.

In the embodiment shown in FIG. 1, air flap system 10 furthermore comprises a radar sensor 120 for detecting an object, such as a pedestrian. Radar sensor 120 is arranged here in an upper cooling air inlet of the air flap system 10.

Air flap system 10 furthermore has an air flap system frame 20. In one embodiment, spring element 100 is clipped or latched into air flap system frame 20. The latching of spring element 100 makes it possible to achieve a well-defined positioning of spring element 100 and air flap system 10. In one embodiment, air flap system 10 has a holding element 30 which is used for the coupling between air flap system 10 and the vehicle frame. Holding element 30 is fastened, in particular screwed, here to the vehicle frame.

Spring element 100 can be, for example, a plastic spring or a metal spring.

A breakaway force is required for releasing spring element 100 from a locking position. The breakaway force is greater than or equal to the resetting force.

A method for assembling the above-described air flap system 10 for controlling the intake of air into a motor vehicle, wherein the air flap system 10 comprises at least one air flap 110 which is pivotable between an open position and a closed position, comprises the following steps:

providing spring element 100 in air flap system 10; and
coupling spring element 100 to a vehicle frame, wherein spring element 100 is elastic at least partially along the longitudinal direction of the vehicle.

Air flap system 10 is suitable for installing in a motor vehicle (not fully shown).

It goes without saying that in the present invention there is a relationship between firstly features which have been described in conjunction with method steps and also secondly features which have been described in conjunction with corresponding devices. Therefore, described method features are also to be considered to be device features which belong to the invention—and vice versa—even if this has not been explicitly stated.

It should be noted that the features of the invention described with reference to individual embodiments or variants, such as for example type and configuration of the individual air flaps and actuators, and the spatial arrangement thereof, can also be present in other embodiments, unless stated otherwise or automatically ruled out for technical reasons. In addition, all features of features of this kind, described in combination, of individual embodiments do not necessarily always have to be realized in a respective embodiment.

What is claimed is:

1. An air flap system for controlling an intake of air into a motor vehicle, comprising:
   at least one air flap of the air flap system which is pivotable between an open position and a closed position; and
   an elastic element which is provided to couple the air flap system to a vehicle frame, wherein the elastic element is elastic at least partially along a longitudinal direction of the vehicle.

2. The air flap system according to claim 1, wherein the elastic element brings about a resetting force in order to bring the air flap system back into a starting position after an impact event.

3. The air flap system according to claim 1, further comprising:
   a radar sensor arranged in the air flap system for detecting an object.

4. The air flap system according to claim 1, wherein the air flap system is mounted elastically by way of the elastic element.

5. The air flap system according to claim 1, wherein the air flap system has an air flap system frame, and the elastic element is clipped in the air flap system frame.

6. The air flap system according to claim 1, wherein the air flap system has a holding element which is used for the coupling between the air flap system and the vehicle frame, and
the holding element is fastened to the vehicle frame.

7. The air flap system according to claim 6, wherein the holding element is screwed to the vehicle frame.

8. The air flap system according to claim 1, wherein the elastic element comprises a plastic spring or a metal spring.

9. The air flap system according to claim 3, wherein the radar sensor is arranged in an upper cooling air inlet of the air flap system.

10. The air flap system according to claim 2, wherein a breakaway force of the elastic element corresponds to a force which is necessary for releasing the elastic element from a locking position, and
the breakaway force is greater than or equal to the resetting force.

11. A method for assembling an air flap system for controlling intake of air into a motor vehicle, wherein the air flap system comprises at least one air flap which is pivotable between an open position and a closed position, the method comprising the steps of:
   providing an elastic element in the air flap system; and
   coupling the elastic element to a vehicle frame, wherein the elastic element is elastic at least partially along a longitudinal direction of the vehicle.

12. A motor vehicle comprising an air flap system according to claim 1.

\* \* \* \* \*